Figure 1:
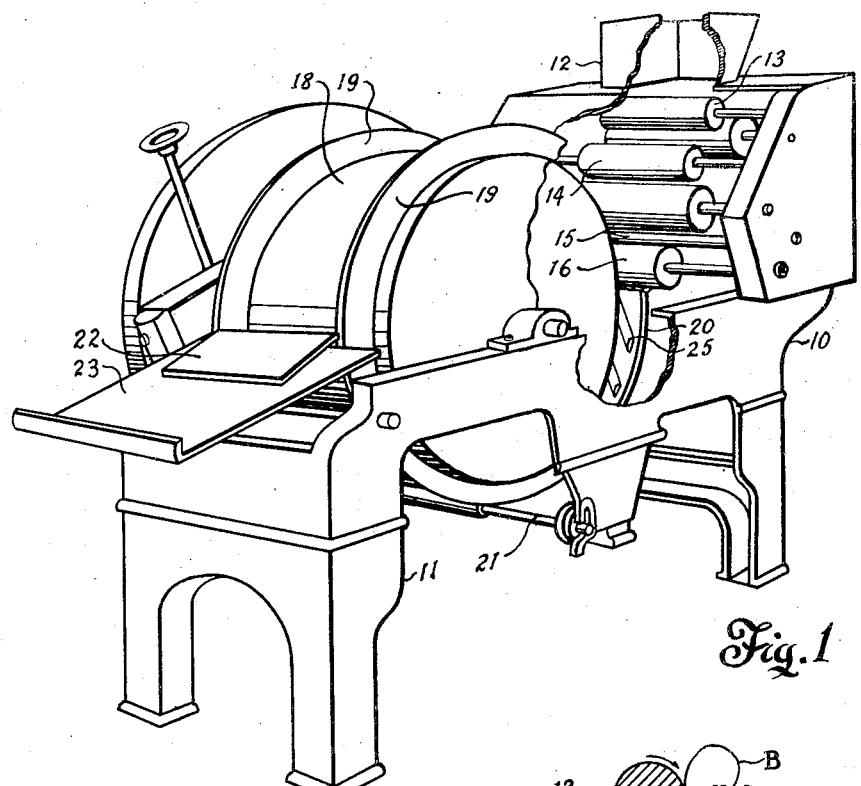

Feb. 15, 1949.  R. W. BAIRD  2,461,868
DOUGH MOLDING MACHINE ATTACHMENT
Filed Dec. 12, 1944  2 Sheets-Sheet 1

Roland W. Baird
Inventor

Jack A. Ashley
Joseph H. Ashley
By
Attorneys

Feb. 15, 1949.   R. W. BAIRD   2,461,868
DOUGH MOLDING MACHINE ATTACHMENT
Filed Dec. 12, 1944   2 Sheets-Sheet 2

Roland W. Baird
Inventor

Patented Feb. 15, 1949

2,461,868

UNITED STATES PATENT OFFICE 2,461,868

DOUGH MOLDING MACHINE ATTACHMENT

Roland W. Baird, Dallas, Tex.

Application December 12, 1944, Serial No. 567,819

2 Claims. (Cl. 107—9)

This invention relates to new and useful improvements in dough moulding machine attachments.

In the conventional dough moulding machine, the dough is fed from a proofer, in the form of substantially spherical balls, through a plurality of spaced rollers to a large revolving drum. The spaced rollers flatten the balls of dough into sheet form and then curl or roll the sheets into cylindrical loaves. A substantially semi-circular pressure board, swung on an arc of greater radius than the drum, is disposed beneath the lower portion of said drum in spaced, concentric relationship to provide an arcuate space therebetween and through which the rotation of the drum carries the cylindrical loaves of dough. A peripheral flange is provided at each side of the drum to confine and seal the ends of the cylindrical dough loaves. Since the loaves are of a diameter greater than the radial depth or thickness of the space between the drum and pressure board, it is manifest that pressure will be applied to said loaves so as to reduce their diameters and elongate the same. Of course, the rotative movement of the drum causes each loaf to rotate upon its respective longitudinal axis so as to maintain the cylindrical form of the same during such thinning and elongation. The cylindrical loaves discharged from the drum are ordinarily ready for baking, but may be lengthened by a special elongator.

Although the curling and rolling of the dough by the rollers and rotatable drum are necessary in order to produce a homogenous mass or loaf having the desired porosity and lightness, air and some liberated gas is entrapped during the curling of said dough and is confined within large pockets or cells by the rolling step which also seals the ends of each dough loaf. Manifestly, there is no control over the size or spacing of these pockets or cells and the rolling step usually results in the combining of several pockets or cells. Various attempts have been made to eliminate these large pockets or cells, such as by cutting the surface of the dough, loaf, puncturing said loaf, dividing and/or twisting the same, but none have met with any marked degree of success due to the cost of labor, the necessity for complicated equipment and accompanying inherent disadvantages.

Therefore, one object of the invention is to provide an improved dough moulding machine attachment for uniformly distributing and restricting the size of the pockets or cells in the dough loaves during the formation thereof so as to produce bread loaves having superior texture and flavor as well as the necessary porosity and lightness.

A particular object of the invention is to provide an improved attachment for a dough moulding machine having a pressure board and rotatable drum, which attachment is adapted to be used in conjunction with the board and drum and which is of such construction that large pockets or cells are eliminated from the dough by the controlled application of pressure whereby an evenly distributed and uniform porosity is had.

An important object of the invention is to provide an improved attachment which is interposed between and co-acts with the pressure board and rotatable drum of a dough moulding machine to control the application of pressure to the dough loaves in such a manner that excess air and/or gas is evenly distributed throughout or released from each loaf so as to provide uniform porosity and texture.

Another object of the invention is to provide an improved dough moulding attachment, of the character described, having means disposed in the space between the pressure board and rotatable drum for individually applying pressure to each dough loaf initially at its medial portion and then to its end portions to cause the entrapped air and/or gas to travel longitudinally of the loaf from its center toward its ends so as to evenly distribute said air and/or gas and eject the excess thereof.

A further object of the invention is to provide an improved dough moulding attachment, of the character described, wherein a plurality of pressure-applying members are secured to the pressure board in proximity to the peripheral surface of the drum for exerting pressure upon the dough loaves, each member having a portion extending at an angle to the travel of said loaves whereby pressure is applied initially to the medial portion of each loaf and then to the end portions thereof so as to permit the distribution of entrapped air and/or gas; the space between the drum and pressure board being of a width greater than the length of the loaves to eliminate the usual sealing of the ends of said loaves and thereby permit the escape of excess air and/or gas through said unsealed ends.

A construction designed to carry out the invention will be hereinafter described together with other features of the invention.

Figure 2:
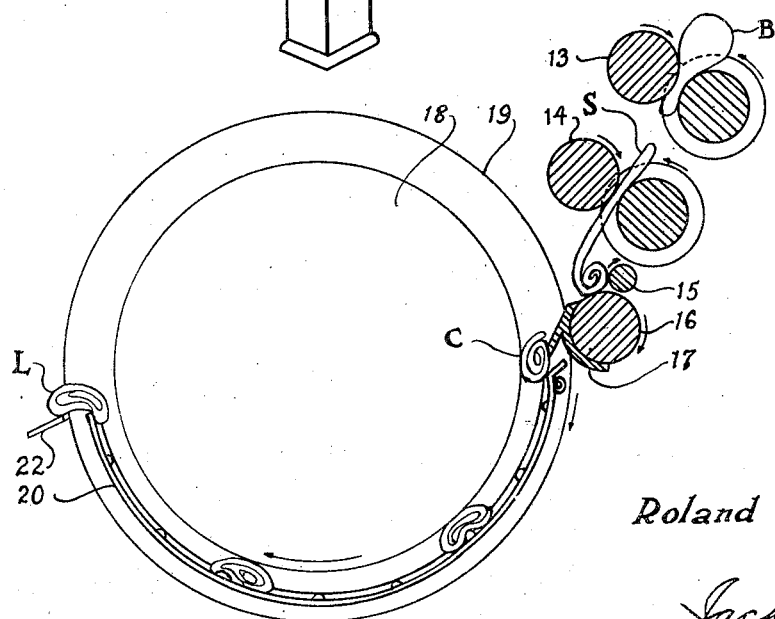
Figure 3:
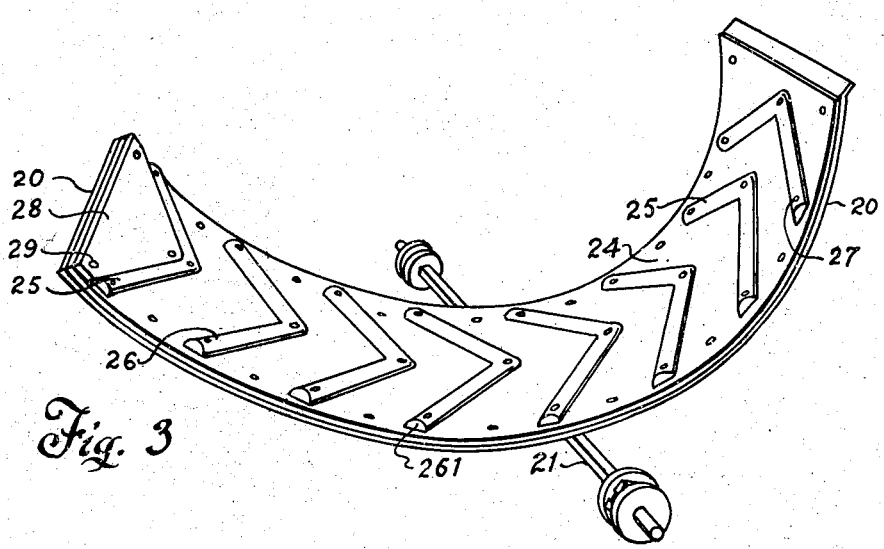
Figure 4:
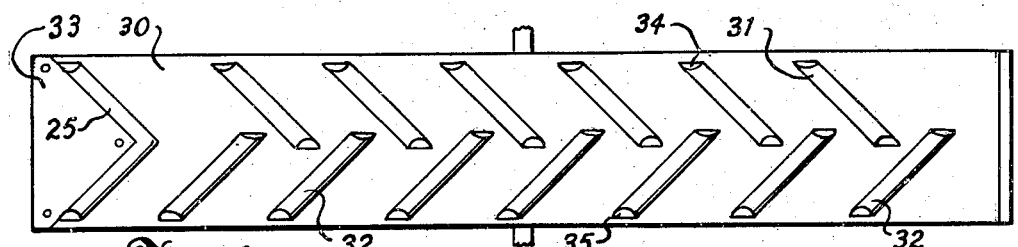
Figure 5:
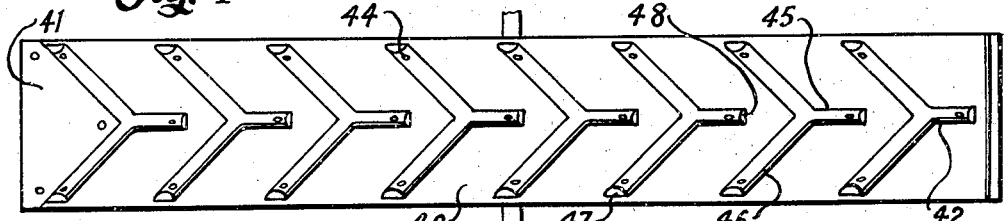
Figure 6:
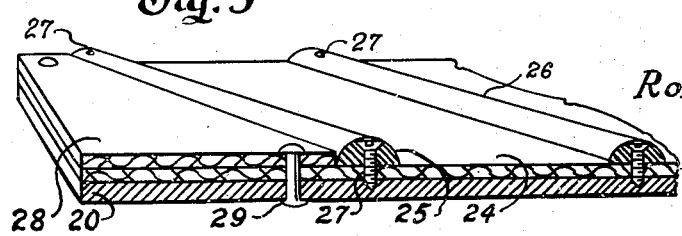

The invention will be more readily understood from a reading of the following specification and by reference to the accompanying drawings, wherein an example of the invention is shown, and wherein:

Fig. 1 is a perspective view of a dough moulding machine having an attachment, constructed in accordance with the invention, mounted thereon, Fig. 2 is a schematic view, showing the operation and relationship of the attachment to the machine, Fig. 3 is a perspective view of a pressure board having the attachment mounted thereon, Figs. 4 and 5 are plan views of pressure boards having modified forms of attachments mounted thereon, and Fig. 6 is an enlarged transverse, vertical, sectional view, showing the securing of the attachment to the pressure board.

In the drawings, the numeral 10 designates a dough moulding machine or moulder which is mounted upon legs 11 and which includes a hopper 12 for receiving dough, in the form of balls B, from an overhead proofer (not shown). A plurality of rollers 13 and 14 are disposed beneath the hopper 12 and are arranged in cooperating spaced pairs for receiving and reducing each dough ball B into sheet form as indicated by the letter S. Each pair of cooperating rollers are rotated in opposite directions and toward each other so as to cause the dough to travel therebetween. The dough sheet S is fed from the lower rollers 14 to a pair of curling rollers 15 and 16, the latter being of greater diameter than the roller 15 and being disposed below and to the left of said roller so as to receive the dough sheet S from the rollers 14 (Fig. 2). The curling rollers are rotated in a clockwise direction so as to curl or roll each sheet S into the form of a cylinder C. An arcuate shield 17 surrounds a portion of the lower curling roller 16 and includes a tangential flange 171 for directing the dough cylinders to a circular revolving drum 18 which is provided with a pair of external, peripheral flange members 19. The drum 18 is constantly rotating in a clockwise direction and carries the flange members 19. However, these flange members are adjustably mounted and may be moved transversely or laterally of the peripheral surface of the drum so as to increase or decrease the width of such surface.

A substantially semi-circular or arcuate pressure board 20 is disposed beneath the drum between the flange members in substantial concentric relationship to said drum. This board is carried by the frame of the machine 10, being preferably attached thereto by a special latch arrangement 21. The dough cylinders C delivered to the drum by means of the shield flange 171 are carried downwardly by said drum and caused to travel through the arcuate or semi-circular path of space between the adjacent surfaces of the pressure board and drum and are finally discharged by an inclined plate 22 onto a receiving platform or shelf 23. This shelf 23 is disposed diametrically across the drum from the curling roller 16 and a loaf elongator (not shown) may be associated therewith. However, the loaves L may be placed directly in baking pans upon being discharged onto the shelf 23 from the revolving drum 18.

The pressure board 20 is swung on an arc of greater radius than the drum 18 and is ordinarily disposed concentric to the peripheral surface of said drum so as to provide a semi-circular or arcuate space therebetween. Due to the dough cylinders C being of diameters greater than the radial depth of this space, pressure is applied to said cylinders during their travel therethrough, thereby elongating and reducing the diameters of the cylinders. Manifestly, the rotation of the drum causes each dough cylinder to rotate upon its respective longitudinal axis, whereby the dough retains its cylindrical form during thinning and elongation thereof. The inner surface of the conventional pressure board is covered with a sheet 24 of suitable fabric, such as heavy canvas or duck (Fig. 6), so as to provide traction for the dough cylinders as they travel upwardly through the arcuate space to the discharge plate 22. Also, the peripheral flange members 19 which form the sides of this space are usually adjusted so as to confine and be engaged by the ends of the dough cylinders, whereby said ends will be sealed by such engagement.

In carrying out the present invention, the adjustment of the flange members is such that the same are spaced an increased distance apart and provide an arcuate space of increased width. In fact, it is preferable that the width of this space be sufficient to accommodate the dough cylinders C after elongation thereof without the ends of said cylinders engaging the flange members. Since the pressure board 20 is disposed between the flange members, it is desirable for said board to be of a width greater than the length of the elongated dough cylinders. The curling and rolling of the dough is designed to produce a homogenous mass or loaf having the desired porosity and lightness, while the sealing of the ends of the dough cylinders or loaves is an inherent result of the necessity of confining and preventing undue elongation of said cylinders or loaves. Manifestly, the curling of the dough entraps air and some liberated gas in the curls or convolutions of said dough and such air or gas is concentrated in large pockets or cells by the rolling action. Frequently, several cells are combined to form larger cells, extending longitudinally of the cylinder or loaf, by this rolling action and escape of the air and gas is prevented by the sealing of the ends of said cylinder or loaf. Thus, the proper spacing of the flange members as well as the width of the pressure board are important to the proper carrying out of the invention.

As is clearly shown in Fig. 2, the discharge end of the pressure board 20 is preferably spaced a slightly lesser distance from the peripheral surface of the drum 18 than is the receiving or inlet end of said board, whereby the radial depth of the space between said board and surface progressively decreases from the inlet to the discharge end of the board. Thus, progressively increasing pressure is applied to the dough cylinders C as the same travel through this space. It is pointed out that the spacing of the pressure board from the peripheral surface of the drum is greater than in ordinary practice so as to increase the radial depth of the space therebetween and apply pressure to the dough cylinders. Instead of a constant, substantially uniform pressure, it has been found advantageous to control the application of pressure to the dough cylinders and to apply the same more or less intermittently and at predetermined points.

Although the pressure may be applied by suitable means carried by the pressure board or the peripheral surface of the drum, it is most economical and feasible for the attachment to take the form of ribs or projections 25 and to mount the same upon the inner, arcuate surface of the pressure board as shown in Fig. 3. These ribs are V-shaped, or in the form of chevrons, which are evenly spaced throughout the length of the pressure board and have their apices directed toward the inlet or right-hand end of said board. The exact shape of each chevron rib is subject to a variation, but has been illustrated as substantially right-angular and the positioning of the same is such that each leg 26 of the rib is disposed at an angle of substantially 45 degrees relative to the longitudinal axis of the pressure board. In addition, it is noted that the length of each leg 26 is such that the outer end of the same is disposed in close proximity to the adjacent marginal edge portion of the pressure board.

As is most clearly illustrated in Fig. 6, the ribs 25 are substantially semi-circular in cross-section and are fastened to the board 20 over the fabric sheet 24 by a plurality of screws 27, the latter extending through said sheet. In order to provide traction for the dough cylinders C at the discharge end of the pressure board, the thickness of said board is increased beyond the endmost chevron rib by securing a substantially triangular strip or sheet 28, of duck or other suitable fabric, in overlying relationship to said end portion by rivets 29 or other suitable means. Due to the shape of the strip 28, the same fills the space between the endmost rib 25 and the discharge end of the pressure board and increases the traction sufficiently to permit the drum 18 to carry the dough cylinders or loaves upwardly and discharge the same onto the plate 22. If desired, the outer extremity of each rib leg 26 may be bevelled or tapered outwardly and downwardly as shown at 26I.

It is pointed out that the positioning of the chevron ribs 25 is such that the diverging ends of the legs of each rib overlap or extend a slight distance beyond the apex of the adjacent succeeding rib, whereby pressure will be constantly applied to some portion of each dough cylinder as it travels through the arcuate space between the drum and board. However, the spacing of the ribs is subject to variation. Attention is directed to the fact that the construction illustrated has been mounted directly over the fabric sheet 24 which is normally employed upon pressure boards and it is believed to be readily apparent that such sheet could be eliminated with the ribs being in direct engagement with the metallic surface of the pressure board. Also, the ribs could be formed integral with the board by stamping, or otherwise forming the same therein, or said ribs could be attached to or formed in the peripheral surface of the drum in reverse relationship to that illustrated.

As has been pointed hereinbefore, the pressure board 20 is spaced an increased distance from the peripheral surface of the drum so as to reduce the pressure applied to the dough cylinders C. Also, the flange members 19 are spaced apart an increased distance so as to eliminate the contact of the dough cylinders with said flange members, it being noted that the latter could be entirely eliminated. Thus, a continuous or constant excessive pressure upon the dough cylinders is eliminated and the ends thereof remain unsealed, whereby the air and gas entrapped within the convolutions of said cylinders are prevented from being concentrated in a few large pockets and are permitted to escape or be more or less evenly distributed. The pressure exerted upon these cylinders is controlled by the ribs 25 and the construction and position of the same is such that pressure will be initially applied to the medial portion of each cylinder by engaging the apex of the first rib as it commences its travel through the space between the pressure board and drum. Due to the angular relationship of the rib legs 26, the dough cylinder will gradually engage the remainder of the rib from its medial portion outwardly toward each end. Manifestly, this causes a wiping action which tends to direct the entrapped air and gas toward the open ends of the dough cylinder. By providing a plurality of ribs, this wiping action is repeated throughout the length of the pressure board and the removal of substantially all entrapped air and gas is assured. Of course, the escape of this air and gas is permitted by the open or unsealed ends of each dough cylinder and any air or gas which remains in the cylinder will necessarily be distributed throughout its length. However, the remaining air or gas will not be confined in large pockets or cells because of the successive wiping actions of the ribs which exert pressure upon the dough cylinder in a continuous, orderly sequence. By the time the ends of each dough cylinder move out of engagement with the legs 26 of one rib, the medial portion of said cylinder engages the apex of the adjacent succeeding rib so as to repeat the above described wiping action. It is pointed out that the ribs also provide traction for each dough cylinder so as to eliminate the necessity for the fabric sheet 24, since a portion of the cylinder is in constant engagement with one of said ribs, or a part thereof. As is clearly shown in Fig. 2, the forward travel and rotation of each dough cylinder C upon its longitudinal axis causes partial flattening of the same so that the discharged loaf L is of a substantially oval shape.

Although the chevron or V-shaped ribs 25 are preferable, it is pointed out that the shape of said ribs is subject to a variation without altering the fundamental wiping action thereof. In Fig. 4, a modified form of pressure board 30 is shown and includes a plurality of straight rib members or elements 31 and 32 which are secured directly to or made integral with the inner surface of said pressure board. The fabric sheet 24 has been eliminated in this form of the invention, since sufficient traction is provided by the rib elements 31 and 32. The elements 31 are disposed in equally-spaced, parallel relationship along one longitudinal edge of the board 30 and preferably at an angle of substantially 90 degrees relative to the elements 32 which positioned in a similar manner along the opposite edge of said board, whereby said elements are arranged in divergent groups with each element extending at an angle of 45 degrees relative to the longitudinal axis of the board. In order to provide the desired wiping action, each element of one group has its inner portion interposed between two of the elements of the other group and, due to its length and angular position, said element bisects the medial portion of the preceding divergent element and has its medial portion bisected by the following divergent element of said other group. Thus, the elements of the two groups are disposed in overlapping, staggered or offset rows.

It is preferable for the rib elements to be semicircular in cross-section so as to prevent breaking of the surface of the dough cylinders during their travel over said elements. Also, the ends of each element may be bevelled or tapered outwardly and downwardly as shown by the numerals 34 and 35. Pressure is adapted to be exerted upon each dough cylinder C by the elements 31 and 32 in substantially the same manner as the ribs 25 and the main distinction is that pressure is constantly applied to some part of the medial portion of said dough cylinders. This is due to the overlapping, staggered relationship of the elements and involves a more frequent or repetitious application of pressure to the medial portion of each dough cylinder. In other words, pressure is first applied to the medial portion by the inner end of the rearwardmost element and then by the inner end of the adjacent divergent element. Simultaneously with the latter application of pressure, the outer end portion of the dough cylinder engages the outer end of the rearward or preceding element so as to exert pressure upon said portion and provide a continuous wiping action for distributing and ejecting entrapped air and gas. By the time the dough cylinder moves out of engagement with the first element, its intermediate portion engages the inner end of the third element, which is parallel to the first element, so as to repeat or duplicate the initial wiping action. Of course, the overlapping relationship of the outer end of the second element causes the same to apply pressure to the opposite end portion of the dough cylinder during the exertion of pressure upon the intermediate portion of said cylinder by said third element. It is believed to be readily apparent that the elements 31 and 32 provide a series of alternate, divergent wiping actions from the intermediate portion to the outer ends of each dough cylinder during its travel through the arcuate space between the drum 18 and pressure board 30 and that the desired results are obtained in a manner slightly different from that of the first form of the invention. Since the fabric strip 24 is omitted from the pressure board 30, said board is positioned slightly closer to the peripheral surface of the drum 18 than is the pressure board 20. A fabric strip 33, similar to the strip 28, may be secured to the forward end portion of the pressure board so as to provide sufficient traction for the ejecting of the dough loaves L. It is pointed out that it is desirable to provide one of the chevron or V-shaped ribs 25 adjacent the forward or discharge end of the pressure board so as to evenly apply pressure to the dough cylinders and assure a straight or uniform discharge of the same.

Another form of the invention is illustrated in Fig. 5 and includes a pressure board 40 which is substantially identical to the boards 20 and 30. If desired, the fabric sheet 24 may be secured to the inner arcuate surface of this board or may be omitted as shown. However, a fabric strip 41, similar to the strips 28 and 33, is preferably secured to the forward end portion of the pressure board to provide sufficient traction for the ejection of the dough loaves L. A plurality of modified ribs or pressure elements 42, of substantially Y-shape, are fastened by screws 44 or other suitable means to the inner arcuate surface of the pressure board 40 in equally-spaced relationship. Each rib 42 includes a short central or medial leg 45 and integral, divergent arms 46 which are preferably disposed at a right angle to each other and at an angle of 45 degrees relative to the legs as well as the longitudinal axis of said board. The ribs have their legs 45 in axial alinement and their arms 46 disposed parallel to one another. In addition, the legs are disposed centrally of the transverse width of the pressure board and in vertical alinement with the longitudinal center line of said board.

Manifestly, the ribs 42 are very similar to the chevron ribs 25 and accomplish the desired outward wiping action in substantially the same manner. In fact, the main distinction between the two ribs or elements is the addition of the medial leg 45 to each element 42. Due to the provision of this leg, pressure is applied to the medial portion of each dough cylinder during its travel through the space between the drum and the pressure board 40 for a longer period of time and at more frequent intervals in a manner somewhat similar to the overlapping inner end portion of the elements 31 and 32 of the second form of the invention. Each element 42 is substantially semi-circular in cross section and has the ends of its arms 46 disposed adjacent the longitudinal marginal edge portion of the pressure board. It is pointed out that the ends of the arms may be bevelled or tapered outwardly and downwardly as shown by the numeral 47, while a similar bevelled or tapered surface 48 may be provided at the free end of each leg 48. These bevelled surfaces eliminate sharp corners and permit a gradual application of and release of pressure from the dough cylinders so as to prevent breaking the surfaces thereof.

From the foregoing, it is manifest that a novel attachment for a dough moulding machine has been provided and that the excess portion entrapped with the dough during the formation thereof into cylinders is removed, while the remainder of said air or gas is evenly distributed throughout the length of said cylinders. By eliminating the peripheral flange members of the revolving drum or by spacing said flange members a sufficient distance apart, confinement and sealing of the ends of the dough cylinders are eliminated so as to permit the escape of the entrapped air and gas in excess of the desired or necessary quantity. The pressure exerted upon the dough by the drum is reduced by the spacing of the pressure board from the peripheral surface thereof and the controlled application of pressure is attained by the use of the pressure elements or ribs 25, 31, 32 and 42. Although these elements might be reversed and carried by the peripheral surface of the drum, it is most feasible and economical to mount the same upon the pressure board by securing or making the same integral with said board.

The pressure exerted upon the dough cylinders by these elements is directed to various portions thereof in an orderly, predetermined manner. Although the form and angular relationship of the pressure elements are subject to variation, it is essential that a wiping action be exerted upon each dough cylinder from the medial portion to the outer ends thereof, with such pressure being exerted initially upon said medial portion. A substantially uniform application of pressure is obtained by each chevron rib 25, while the other forms of the pressure elements provide an increased or more frequent application of pressure to the medial portion of each dough cylinder. However, all of the pressure elements or ribs provide the desired wiping action which forces the entrapped air or gas longitudinally outwardly of each dough cylinder so as to distribute the same throughout the longitudinal length thereof and eject any excess air or gas from the open, unsealed ends of the dough cylinder. Thus, the concentration of air and gas in large cells or pockets is obviated so as to provide a loaf of substantially uniform texture and porosity. Attention is directed to the fact that the pressure elements or ribs also provide traction for the dough cylinders so as to eliminate the necessity of using the usual fabric sheet 24 upon the inner arcuate surface of the pressure board; however, if desired, this fabric sheet may be used in conjunction with the elements. It is again noted that the particular form and angular position of the pressure elements or ribs are subject to variation and may take any shape, form or angularity within the scope of the appended claims.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A dough moulding machine including, a revolving drum, a pressure board curved longitudinally and underlying the drum in spaced relation thereto, a continuous fabric lining secured to the upper side of the pressure board and extending from end to end of said board, said lining being of uniform thickness transversely and longitudinally except at its discharge end to provide a continuous unbroken surface, and V-shaped upstanding ribs mounted on the continuous unbroken surface of the lining in regular spaced order, the outer end of each leg of each rib terminating in close proximity to the longitudinal edge of the lining.

2. A dough moulding machine as set forth in claim 1, with an additional lining layer beyond the last rib at the discharge end of the board.

ROLAND W. BAIRD.

REFERENCES CITED

The following references are of record in the file of this patent:

UNITED STATES PATENTS

| Number | Name | Date |
|---|---|---|
| 901,577 | Williams | Oct. 20, 1908 |
| 1,787,778 | Dell | Jan. 6, 1931 |
| 2,082,753 | Parsons et al. | June 1, 1937 |

FOREIGN PATENTS

| Number | Country | Date |
|---|---|---|
| 350,910 | Great Britain | June 15, 1931 |
| 183,848 | Great Britain | July 26, 1923 |
| 830,408 | France | July 29, 1938 |